United States Patent
Sepe et al.

(10) Patent No.: US 12,505,919 B1
(45) Date of Patent: Dec. 23, 2025

(54) SYSTEMS AND METHODS FOR AUTOMATED PHARMACEUTICAL STOCK MANAGEMENT

(71) Applicant: WALGREEN CO., Deerfield, IL (US)

(72) Inventors: Paolo Sepe, Naples (IT); Richard Ian Naylor, Derbyshire (GB); Sarah Helen Scriver, Nottingham (GB); Giovanni Passarella, Naples (IT); Farid Poonja, Epsom (GB); Neil Younger, Lincoln (GB); Felipe Sanchez, Schaumburg, IL (US)

(73) Assignee: WALGREEN CO., Deerfield, IL (US)

(*) Notice: Subject to any disclaimer, the term of this patent is extended or adjusted under 35 U.S.C. 154(b) by 310 days.

(21) Appl. No.: 17/353,101

(22) Filed: Jun. 21, 2021

(51) Int. Cl.
| | | |
|---|---|---|
| *G16H 40/20* | (2018.01) | |
| *G06N 20/00* | (2019.01) | |
| *G06Q 10/087* | (2023.01) | |
| *G16H 20/10* | (2018.01) | |

(52) U.S. Cl.
CPC .......... *G16H 40/20* (2018.01); *G06N 20/00* (2019.01); *G06Q 10/087* (2013.01); *G16H 20/10* (2018.01)

(58) Field of Classification Search
CPC .............. G06Q 20/203; G06Q 10/06315
See application file for complete search history.

(56) References Cited

U.S. PATENT DOCUMENTS

| | | | | |
|---|---|---|---|---|
| 7,398,232 | B2 * | 7/2008 | Renz | G06Q 10/06 705/28 |
| 10,546,269 | B1 * | 1/2020 | Gaurav | G06Q 10/087 |
| 10,621,687 | B1 * | 4/2020 | Sepe | G06Q 10/06315 |
| 2020/0320470 | A1 * | 10/2020 | Whitney | G06F 9/547 |
| 2021/0043309 | A1 * | 2/2021 | Tiwari | G06N 20/00 |
| 2022/0083955 | A1 * | 3/2022 | DeLuca | G06Q 10/087 |
| 2022/0284382 | A1 * | 9/2022 | Demizu | G06Q 30/0202 |
| 2022/0318613 | A1 * | 10/2022 | Nambirajan | G06N 3/045 |

(Continued)

FOREIGN PATENT DOCUMENTS

| | | | |
|---|---|---|---|
| JP | 2004295227 A | * | 10/2004 |
| JP | 2018097557 A | * | 6/2018 |

(Continued)

OTHER PUBLICATIONS

F. Fruggiero, R. Iannone, G. Martino, S. Miranda and S. Riemma, "A forecast model for pharmaceutical requirements based on an artificial neural network," Proceedings of 2012 IEEE International Conference on Service Operations and Logistics, and Informatics, Suzhou, China, 2012, pp. 263-268, (Year: 2012).*

(Continued)

*Primary Examiner* — Marie P Brady
(74) *Attorney, Agent, or Firm* — MARSHALL, GERSTEIN & BORUN LLP; Randall G. Rueth (57) ABSTRACT

The current disclosure relates to systems and methods for prescription stock management at one or more pharmacies in a pharmacy chain. The system initializes and trains a stock management model using machine learning techniques in order to calculate outputs such as a minimum stocked number, a maximum stocked number, and an order amount for at least one prescription item. The system then monitors the inventory of the prescription item, and transmits an order, based on the order amount, for the prescription item if the stock of the prescription item is less than the minimum stocked number.

16 Claims, 5 Drawing Sheets

(56) References Cited

U.S. PATENT DOCUMENTS

2022/0358451 A1* 11/2022 Huang ................. G06Q 10/087
2023/0162082 A1* 5/2023 Dhingra ................... G06N 7/01
706/12

FOREIGN PATENT DOCUMENTS

| JP | 6722927 B2 * | 7/2020 | |
|---|---|---|---|
| KR | 20210073309 A * | 6/2021 | ............. G06Q 10/02 |
| WO | WO-2004034305 A2 * | 4/2004 | ........... G06Q 10/087 |
| WO | WO-2018213887 A1 * | 11/2018 | ......... G06Q 30/0283 |
| WO | WO-2022039588 A1 * | 2/2022 | ............. G06N 3/006 |

OTHER PUBLICATIONS

C. A. Mitrea and C. K. M. Lee, "Design and development of a knowledge discovery system in inventory management," 2009 IEEE International Conference on Industrial Engineering and Engineering Management, Hong Kong, China, 2009, pp. 1449-1453, doi: 10.1109/IEEM.2009.5373063. (Year: 2009).*

T. Inprasit and S. Tanachutiwat, "Reordering Point Determination Using Machine Learning Technique for Inventory Management," 2018 International Conference on Engineering, Applied Sciences, and Technology (ICEAST), Phuket, Thailand, 2018, pp. 1-4, doi: 10.1109/ICEAST.2018.8434473. (Year: 2018).*

* cited by examiner

| PRESCRIPTION ITEM — 450 | CURRENT STOCK — 405 | MINIMUM STOCK — 410 | MAXIMUM STOCK — 415 | ORDER AMOUNT — 420 |
|---|---|---|---|---|
| PRESCRIPTION A — 451 | 275 | 100 | 1000 | 500-600 — 421 |
| PRESCRIPTION B — 452 | 53 | 25 | 300 | 100 |
| PRESCRIPTION C — 453 | 5 | 2 | 15 | 10 |
| PRESCRIPTION D — 454 | 45 | 45 | 400 | 300 |

460 — AN ORDER HAS BEEN PLACED
PRESCRIPTION D 300 UNITS
PRESCRIPTION A 500 UNITS

470 — PRESCRIPTION C IS ELIGIBLE FOR REORDER

480 — PRESCRIPTION D IS SCHEDULED FOR A REFILL ORDER ON JULY 31, 2020

490 — FEEDBACK

SYSTEMS AND METHODS FOR AUTOMATED PHARMACEUTICAL STOCK MANAGEMENT

TECHNICAL FIELD

The present disclosure generally relates to a system and method for automatically tracking, ordering, and replenishing prescription inventory and, more particularly, to use machine learning techniques to analyze data in order to forecast needs and more precisely manage pharmaceutical inventory.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Traditionally, retailers have processes for managing stock of various items. Typically, these processes are straightforward, especially for non-perishable goods. However, stock tracking and ordering for prescription drugs differs from traditional stock inventory for retailers. Some of these differences may be attributed to retailer stock being promotionally driven and, as a result, somewhat predictable. Furthermore, prescription drugs are perishable and, if ordered too soon or in too great amount, risk expiration prior to sale, thereby increasing the cost borne by the pharmacy.

Optimally, prescription stock should be sold at an acceptable amount of time prior to expiration but with enough inventory on hand in the event that demand outpaces the rate at which new stock may be ordered and replenished. Current prescription stock management requires a great deal of observation, inventory, and manual ordering of new prescription drugs on a per-store level. However, these manual methods are flawed and can lead to imbalanced inventory. For example, a spike in demand might lead to an excessively large order, leading to spoilage.

To further complicate matters, the rate at which some prescription items are dispensed and their cost may greatly differ among stocked prescription items at a single pharmacy. Because it is undesirable to risk overstocking more expensive prescription items, traditional stock ordering processes force pharmacies to order new stock more frequently for prescription items that are more often dispensed and/or have a lower cost, which complicates the ordering process.

SUMMARY

As described further herein, the disclosure generally relates to systems, methods, and non-transitory computer-readable media storing instructions for automated pharmaceutical stock management. An embodiment of the present disclosure includes a computer-implemented method of performing prescription stock management comprising initializing, by one or more processors using a machine learning algorithm, a stock management model for at least one prescription item of a plurality of prescription items, wherein the stock management model produces outputs including a minimum stocked number, a maximum stocked number, and an order amount for the at least one prescription item, wherein initializing the stock management model includes calculating initial outputs, wherein the outputs are based on forecasts for a predefined amount of time in the future, and wherein at least the order amount is variable based on the predefined amount of time. The method further includes training, by one or more processors using a machine learning algorithm, the stock management model using training data to refine at least one output. The method further includes monitoring, by one or more processors, an inventory for one or more prescription items from the plurality of prescription items at a pharmacy. The method also includes transmitting, by one or more processors, an order to an external computing device when the inventory of one or more prescription items from the plurality of prescription items is less than the corresponding minimum stocked number, wherein the order is based on the order amount.

In another embodiment of the present disclosure, a system for performing prescription stock management comprises a database configured to store an inventory for one or more prescription items from a plurality of prescription items at a pharmacy, an input device communicatively coupled to the database, one or more non-transitory storage media configured to store processor-executable instructions, and one or more processors operatively connected to the database, the input device, and the one or more non-transitory storage media and configured to execute the processor-executable instructions. The instructions cause the system to initialize, using a machine learning algorithm, a stock management model for at least one prescription item of a plurality of prescription items, wherein the stock management model produces outputs including a minimum stocked number, a maximum stocked number, and an order amount for the at least one prescription item, wherein to initialize the stock management model includes to calculate initial outputs, wherein the outputs are based on forecasts for a predefined amount of time in the future, and wherein at least the order amount is variable based on the predefined amount of time. The instructions further cause the system to train, using the machine learning algorithm, the stock management model using training data, to refine the outputs. The instructions cause the system to monitor the inventory for the one or more prescription items from the plurality of prescription items at the pharmacy. The instructions further cause the system to transmit an order to an external computing device when the inventory of one or more prescription items from the plurality of prescription items is less than the corresponding minimum stocked number, wherein the order is based on the order amount.

In still another embodiment of the present disclosure, a tangible, non-transitory computer-readable medium storing processor-executable instructions that, when executed by one or more processors of a system, causes the system to initialize, using a machine learning algorithm, a stock management model for at least one prescription item of a plurality of prescription items, wherein the stock management model produces outputs including a minimum stocked number, a maximum stocked number, and an order amount for the at least one prescription item, wherein to initialize the stock management model includes to calculate initial outputs, wherein the outputs are based on forecasts for a predefined amount of time in the future, and wherein at least the order amount is variable based on the predefined amount of time. The instructions further cause the system to train, using the machine learning algorithm, the stock management model using training data to refine the outputs. The instructions cause the system to monitor an inventory for one or more prescription items from the plurality of prescription items at a pharmacy. The instructions further cause the system to transmit an order to an external computing device when the inventory of one or more prescription items from the plurality of prescription items is less than the corresponding minimum stocked number, wherein the order is based on the order amount.

This summary is not comprehensive and is necessarily limited to certain aspects of the invention described herein. Additional or alternative components, aspects, functions, or actions may be included in various embodiments, as described further below.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The system of this disclosure implements one or several techniques discussed below for managing prescription stock for a pharmacy or other retail store. Rather than simply relying on typical stock management strategies (i.e., when stock of prescription A goes below X units, order Y units as a refill, where X and Y are constants), the current disclosure implements machine learning algorithms to analyze data and determine appropriate thresholds to trigger an order placement. Further, the demand for prescription items is often lumpy with 30-day and 90-day prescriptions. Thus, there is a need for less reactive stock management to avoid over/under stocking prescription items. To combat these deficiencies, the current disclosure implements machine learning to forecast inventory needs and place refill orders sized to avoid spoilage and to minimize the number of orders placed annually.

The system of the current disclosure analyzes large sets of data to determine pharmacy inventory needs. The data for the machine learning system may be collected from various disparate sources and may comprise both public and private information. The data may range from store specific data to more general data applied to an entire retail chain. Similarly, the data may include various information regarding each of the prescriptions carried at the pharmacy. As more data is collected, the system continually evaluates previous orders for success and further analyzes the data to forecast future sales and inventory needs. The entire process may be improved as more data is collected and results are assessed.

Figure 1:
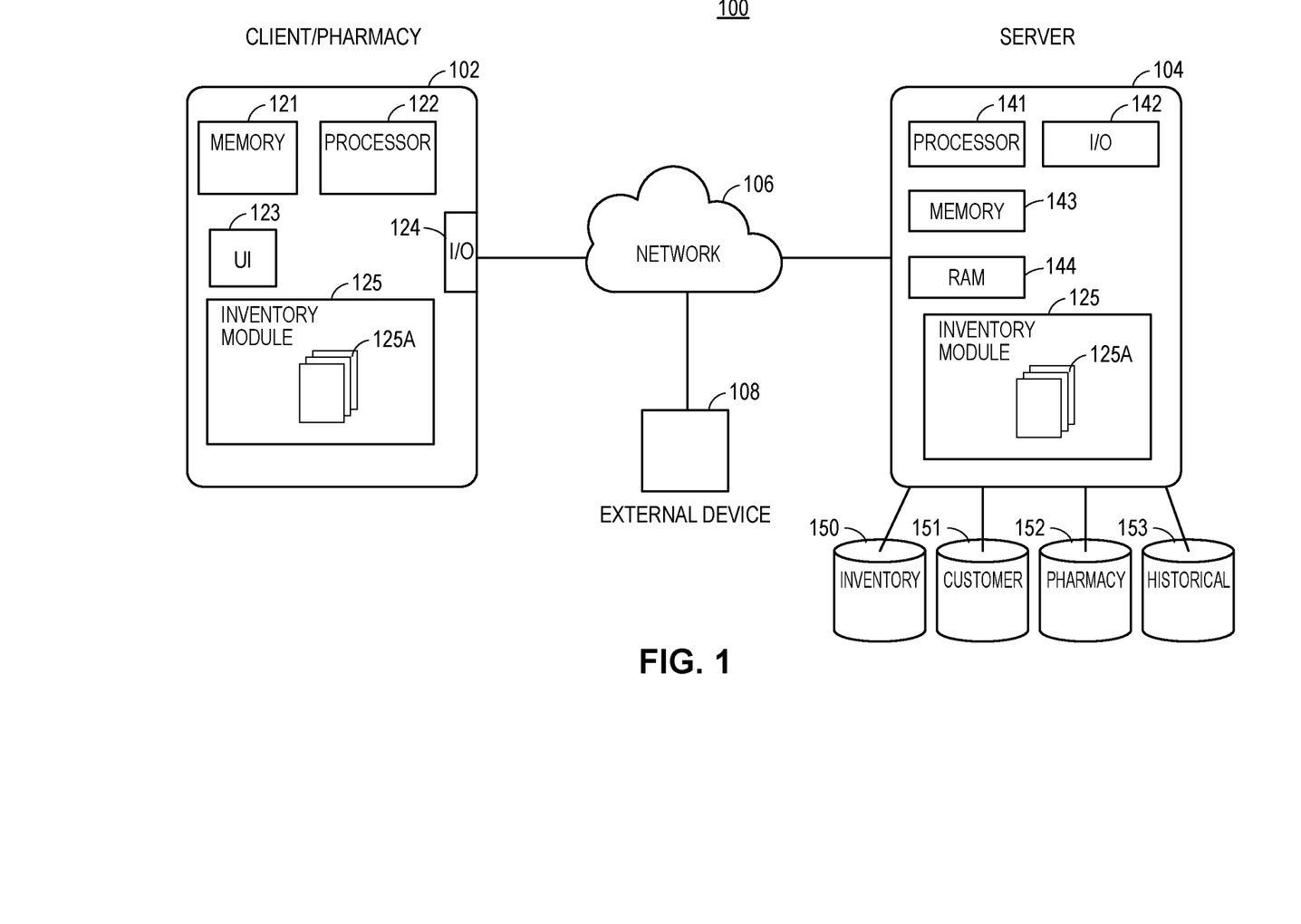
FIG. 1 illustrates a block diagram of an exemplary automated prescription stock management system 100 in accordance with an exemplary embodiment of the present disclosure.

An example computing environment in which the system of this disclosure can operate is discussed first with reference to FIG. 1, followed by a discussion of several example use cases and methods that can be implemented in the system of FIG. 1.

FIG. 1 illustrates a block diagram of an example prescription stock management system 100 in accordance with an exemplary embodiment of the present disclosure. The prescription stock management system 100 may implement the techniques outlined above and described in further detail below. The prescription stock management system may include a client computing device 102, a server 104, a network 106, as well as any number of external devices 108. FIG. 1 only illustrates a single example of each device for simplicity, it should be understood that any suitable number of devices 102, 104, and 108 may be included in the stock management system 100.

FIG. 1 includes a client computing device 102 which can be, for example, a computer deployed in a pharmacy. The computing environment 100 in general can include any suitable number of client computing devices 102 operating across one or more pharmacies. For example, the client computing devices 102 may form a network of pharmacy computers, which may belong to the same pharmacy region (e.g., pharmacy locations within a city or within a particular portion of a city), pharmacy locations within a group of regions, pharmacy locations within the same country, pharmacy locations within a group of countries or separate countries, etc. Client computing device 102 may be associated with or operated by users (e.g., a pharmacist and/or a pharmacy technician) within the pharmacy. Further, client computing device 102 may be implemented to access prescription item information for the various patients that have been prescribed prescription items (e.g., prescription drugs), enter in the details of when a prescription item has been dispensed, and order stock to replenish dispensed prescription items.

The client computing device 102 can include a memory 121, one or more processors 122, a network interface 124, a user interface (UI) 123, as well as an inventory module 125. The memory 121 can be a non-transitory memory and can include an operating system 121A and one or several suitable memory modules, such as random-access memory (RAM), read-only memory (ROM), flash memory, other types of persistent memory, etc. The network interface 124 can support any suitable communication protocol to communicate with remote servers and other devices via the communication network 106. The UI 123 can include any suitable combination of input devices such as a touchscreen, a keyboard, a microphone, etc. and output devices such as screens, speakers, etc. The memory 121 stores an operating system (OS) 121A, which can be any type of suitable mobile or general-purpose operating system.

The prescription stock management system 100 further includes one or more servers 104 operated by the pharmacy. The server 104 can receive data from the client computing device 102 and other client devices (such as external device 108), and further retrieve data from databases 150-153. The computing environment 100 in general can include any suitable number of providers of content and/or databases related to pharmaceutical data. The server 104 and the client computing device 102 can communicate via a network 106, which can be a wide area network such as the internet, for example, and include wired and/or wireless communication links.

For simplicity, FIG. 1 illustrates the server 104 as only one instance of a server device. However, the server 104 according to some implementations includes a group of one or more server devices, each equipped with one or more processors and capable of operating independently of the other server devices. Server devices operating in such a group can process requests from the client computing device 102 individually (e.g., based on availability), in a distributed manner where one operation associated with processing a request is performed on one server device while another operation associated with processing the same request is performed on another server device, or according to any other suitable technique. For the purposes of this discussion, the term "server" may refer to an individual server device or to a group of two or more server devices.

With continued reference to FIG. 1, the server 104 includes one or more processors 141 a network interface 142 and a non-transitory memory 143 (e.g., a hard disk, a flash drive). The memory 143 can be a non-transitory memory and can include one or several suitable memory modules, such as random-access memory (RAM 144), read-only memory (ROM), flash memory, other types of persistent memory, etc. The network interface 142 can support any suitable communication protocol to communicate with remote servers and other devices via the communication network 106. In an embodiment, the memory 143 may store instructions that implement a prescription stock management system using an inventory module 125 including one or more prescription profiles 125A. The instructions that implement the inventory module 125 are executable on the one or more processors 141.

The inventory module 125 may implement machine learning techniques to analyze data (such as data from databases 150, 151, 152, and 153) to forecast inventory needs. The inventory module 125 may further be configured to place and/or schedule orders for prescription items as necessary. For example, the inventory module may communicate with a device corresponding to a manufacturer, such as external device 108, in order to place an order for one or more prescriptions. In another embodiment, the inventory module 125 may be configured to send a notification to one or more client computing devices 102 of the pharmacy that a refill order should be placed for one or more prescription items.

Further, for each prescription item of the pharmacy, the inventory module 125 may store a prescription profile 125A which stores a maximum stocked number, a minimum stocked number, a threshold value, an order amount, and other information associated with the prescription item. The inventory module 125 may store a prescription profile 125A for any number of prescription medicines carried at one or more pharmacies. In some embodiments, the inventory module 125 may store separate prescription profiles 125A for the same prescription items for each pharmacy in a pharmacy chain, such that each pharmacy in the pharmacy chain has a unique set of prescription profiles 125A. Further, the inventory module 125 may store prescription profiles 125A for other items such as non-prescription medicines, medical devices, and other items carried by the pharmacy used for medicinal and/or treatment purposes. As new data is collected and analyzed by inventory module 125, the data stored in the prescription profiles 125A may be altered to more accurately reflect the needs of the pharmacy.

In various embodiments, the inventory module 125 may be deployed in whole by the server 104 or the client computing device 102. In other embodiments, the inventory module 125 may be deployed across multiple devices, such as the client computing device 102 and the server 104, to perform prescription stock analysis and inventory management. The process implemented by inventory module 125 is discussed in greater detail below with reference to FIG. 2.

The server 104 can be communicatively coupled to one or more databases 150-153 that store data that can be used by the inventory module 125 to forecast prescription inventory needs. For example, server 104 may be coupled to an inventory database 150 which includes data related to the current prescription inventory at one or more pharmacies of the system 100. The inventory database 150 may also include data related to the inventory capacity for each pharmacy in the system 100. The inventory module 125 may monitor the inventory of the prescription items, and place appropriate orders as inventory of one or more prescription items falls below a threshold value. Further, the inventory module 125 can use the inventory data 150 to inform the order amount and/or a maximum stocked number.

The inventory database 150 may also store data for each prescription item such as an inventory allotment for the item. For example, if a prescription item has a large demand, then a greater inventory allotment will be reserved for that particular item. The inventory module 125 may use this data to determine a maximum capacity for the prescription item.

The server 104 may also be coupled to a customer database 151 which stores data for customers of the pharmacy network. In some implementations, the customer database 151 includes information for customers of the pharmacy, including their current prescriptions and/or prescription history as well as their preferred pharmacy locations. The inventory module 125 may analyze the data to forecast prescription stock needs based on the number of customers that have prescriptions for each prescription item. Further, the inventory module 125 may implement machine learning techniques to determine which prescription items will have greater demand in the near future based on customer trends. Similarly, the inventory module 125 may be able to forecast prescription inventory needs for a new pharmacy location based on existing customers in the area. In another embodiment, the inventory module 125 may be able to forecast prescription inventory needs for existing locations if a one or more proximately located pharmacy locations are scheduled to close.

The server 104 may also be communicatively coupled to a pharmacy database 152 that stores data related to one or more pharmacies in a pharmacy chain. For example, the pharmacy database 152 may include a dispense rate for one or more prescription items. In some embodiments, the pharmacy data 152 base may store the dispense rate based on the average daily, average weekly, average monthly, or average seasonal dispense rates. Similarly, the pharmacy database 152 may store a return rate of each prescription item at each pharmacy. Further, the pharmacy database 152 may include additional data for each prescription item, such as the size of each unit (i.e., the amount of space needed to store the prescription item), the shelf life, the price of each unit, shipping costs, and/or order information for each prescription item (e.g., where each item can be obtained, ordering procedures, minimum order amount).

Additionally, the server may be communicatively coupled to a historical database 153 that stores data corresponding to past orders. The historical data 153 may indicate the size and date of each order. Further, the historical data 153 may provide details about which orders resulted in spoilage or other inventory deficiencies. Historical data 153 may also include information regard the cost of previous orders, which can allow the inventory module 125 to forecast pricing trends for prescription items.

In general, the server 104 can access any suitable number of databases not pictured in FIG. 1, such as those storing various algorithms, insurance data, pharmacy trends, new products, etc.

With continued reference to FIG. 1, network 106 may be configured as any suitable network configured to facilitate communications between one or more computing devices 102, external device 108, and server 104. For example, network 106 may be coupled to one or more external devices 108 via one or more landline, Internet Service Provider (ISP) backbone connections, satellite links, public switched telephone networks (PSTNs), etc.

To provide additional examples, network 106 may include a proprietary network, a secure public internet, a mobile-based network, a virtual private network, etc. Network 106 may include any suitable number of interconnected network components that form an aggregate network system, such as dedicated access lines, plain ordinary telephone lines, satellite links, cellular base stations, a public switched telephone network (PSTN), etc., or any suitable combination thereof.

In some embodiments, network 106 may facilitate one or more computing devices 102 and/or external device 108 connecting to the Internet. In embodiments in which network 106 facilitates a connection to the Internet, data communications may take place over communication network 106 via one or more suitable Internet communication protocols. In various embodiments, network 106 may be implemented, for example, as a wireless telephony network (e.g., GSM, CDMA, LTE, etc.), a Wi-Fi network (e.g., via one or more IEEE 802.11 Standards), a WiMAX network, etc.

Server 104 may include one or more external computing devices, which may be implemented as any suitable number of components configured to store data, receive data from one or more client computing devices 102 and/or external devices 108 (or one another), and/or send data to one or more client computing devices 102 and/or external device 108 (or one another) via communication network 106 or any other suitable combination of wired and/or wireless links. In various embodiments, the server 104 may be configured to execute one or more applications to facilitate one or more aspects of the functionality used in accordance with one or more embodiments as discussed herein.

In various embodiments, the client computing device 102, the server, 104 and/or databases 150-153 may store and/or access secure data that is of a private, proprietary, and/or sensitive nature. As a result, various embodiments of server 104, network 106, and/or one or more computing devices 102 may implement appropriate security protocols such as encryption, secure links, network authentication, firewalls, etc., to appropriately protect and secure such data.

Figure 2:
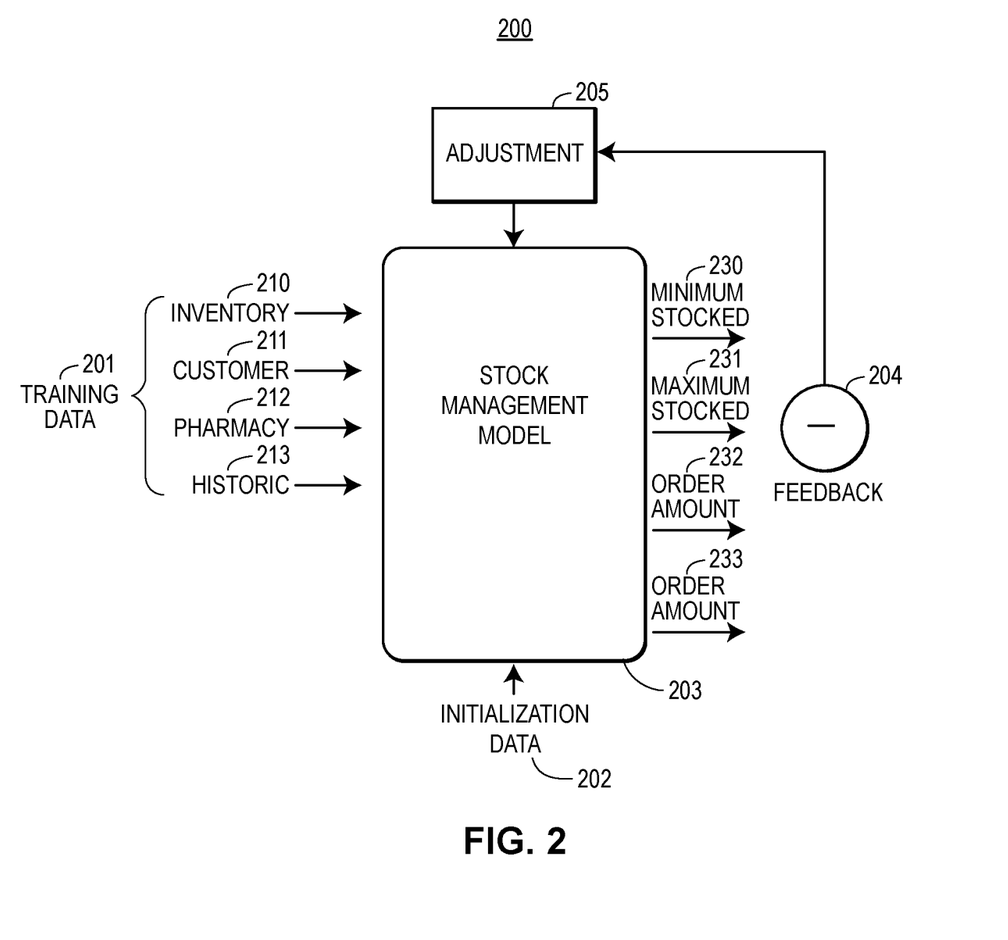
FIG. 2 illustrates a block diagram of an example machine learning model which the system of FIG. 1 may implement to automatically manage inventory of one or more prescription items.

Now referring to FIG. 2, the inventory module 125 in some implementations trains a stock management machine learning model ("stock management model") 203 using various inputs, received data, initialization data 202, feedback 204, etc, represented by block diagram 200. The inventory module 125 can receive various inputs 210, 211, 212, and 213 as training data 201 and apply the training data 201 to the initialization data 202 to train the stock management model 203. The stock management model 203 may analyze the various inputs in order to forecast demand for one or more prescription items and subsequently output, for each of the prescription items, a minimum stocked number 230, a maximum stocked number 231, an order amount 232, and a threshold value 233.

The minimum stocked number 230 indicates the minimum inventory to maintain on hand for a particular qualifying prescription item. In some embodiments, the minimum stocked number 230 may act as a trigger, for example, upon which to inventory module 125 may generate and transmit a purchase order for the prescription item when the inventory of the prescription item falls below the minimum stocked number 230. Conversely, the maximum stocked number 231 may indicate a maximum allotted stock for a particular prescription item. Thus, the maximum stocked number 231 may act as an upper limit on the order amount 232.

The order amount 232 indicates that number of units for a prescription refill order of a particular prescription item. The order amount 232 is intended to result in optimal inventory management with little to no excess inventory (e.g., spoilage) and with a minimal number of orders placed. As discussed in greater detail below with respect to FIG. 3, the order amount 232 may vary by date to reflect year-over-year demand. In some embodiments, the order amount 232 may include an error allotment, which may provide a pharmacist to increase or decrease the order size within a predefined range.

To determine the order amount 232, the stock management model may also calculate additional forecasted parameters. For example, the stock management model may forecast an average daily dispense rate and/or an average daily return rate for the prescription item. Accordingly, the order amount 232 may be large enough to accommodate the average daily dispense rate without resulting in excess inventory. Further, the forecasted dispense rate may also be used to project sales and determine when an item may go out of stock. The inventory module may then schedule refill orders based on the projected sales, if necessary.

The threshold value 233 may indicate that a prescription unit is eligible for a refill order. Unlike the minimum stocked number 230, the threshold value 233 may not indicate a need for an immediate refill. Instead, the threshold value 233 may prompt the inventory module 125 to perform an action. In some instances, if the inventory for a prescription item falls below the threshold value 233, the inventory module 125 may automatically display a notification on a client computing device of the pharmacy indicating that the inventory for the prescription item is low. In turn, a pharmacist may manually check if the inventory is correct and/or manually place an order.

In another embodiment, when a prescription item's inventory falls below the threshold value 233 the inventory module 125 may place the prescription item on a "ready to order" list. The inventory module 125 may then place a refill order when multiple prescription items are on the ready to order list, for example, to save on shipping costs. In another embodiment, when inventory of a prescription item falls below the threshold value 233, the inventory module may check inventory of the prescription item at nearby pharmacy locations to determine if an inventory transfer would be appropriate.

The stock management model 203 may first be initialized and then trained through a machine learning process to refine the outputs 230-233. The stock management model 203 may first be initialized with the initialization data 202, which may provide a preselected number of algorithms and other data for preliminary analysis. For example, initialization data 202 may include one or more initial algorithms that can be calculated to provide outputs 230-233. As training data 201 and feedback 204 are received, the inventory module 125 can further refine the stock management model 203 to improve results. Further, the inventory module 125 may make one or more adjustments 205 to the stock management model 203 based on the feedback 204 and other data.

The stock management model 203 may calculate the outputs using a variety of known techniques, or techniques developed in the future. For example, the stock management model 203 may analyze data spanning the previous 24 months in 2-week increments. In an embodiment, the stock management model 203 may then forecast demand in daily increments for a period of 10 weeks in the future. Subsequently, the stock management model 203 may then produce outputs 230-233 that is variable based on time and based on the forecasted demand. As new training data 201 and feedback 204 are collected, the stock management model 203 may alter the forecasts accordingly. The stock management model 203 may implement techniques such as weighted regressions, blending, double blending, iteration, etc. to analyze the data and produce the outputs 230-233. The above example is intended for illustrative purposes and is not meant to be limiting.

As an illustrative example of the machine learning process, initialization data 202 for prescription X for a certain pharmacy Y may include a minimum stocked number 230 of A, a maximum stocked number 231 of B, an order amount 232 of C, and a threshold value 233 of D. The inventory module 125 may then alter the stock management model 203 based on the new information and subsequently recalculate the values A, B, C, and/or D based on inputs 201 and/or feedback 204. For example, the inventory module 125 may receive inventory data 210 indicating that capacity at pharmacy Y has increased. The inventory module 125 may then add the new data to the stock management model 203 which, when recalculated, may result in an increase to the maximum stocked value 231 to B+10. However, the change to the stock management model 203 may or may not result in an increase to the order amount 232, as an increase in capacity does not necessary reflect a need for additional stock on hand.

Continuing with the above illustrative example, the inventory module 125 may receive customer data 211 indicating that pharmacy Y has an increase of customers for prescription X. Accordingly, the inventory module 125 may implement the data to train the stock management model 203, which may result in an increase to the order amount 232 to C+10 and the threshold amount 233 to D+12. In another example, the inventory module 125 may receive pharmacy data 212 indicating a new dispense rate and/or a return rate which may result in a change to values 230-233.

Further, pharmacy data 212 may indicate that prescription X is purchased from the same supplier as prescription Y. In the event that inventory module 125 places an order from one of prescription X or Y, inventory module 125 may also place an order for the other one or prescription X or Y to save on shipping costs, even if inventory of the second prescription item has not depleted below the corresponding minimum stocked number 230.

The inventory module 125 may also receive and use historic data 213 to train the stock management model 203. Historic data 213 may include data regarding previous orders including the size, date, and success of each order (e.g., if there was spoilage). Based on the historic data 213, the inventory module 125 may identify trends in data based on time periods, and the outputs 230-233 may additionally reflect the date, as described in greater detail with respect to FIG. 3. For illustration and continuing with the example above, the inventory module 125 may implement the data to train the stock management model 203 which may then indicate that prescription X is in greater demand during the winter months and accordingly increase the order amount 232 of prescription X to C+20 during that period of time.

Training data 201 may vary based on the embodiment and the above examples are not intended to be limiting. The stock management model 203 may receive more or less data as necessary to forecast demand 235 in order to determine outputs 230-233. For example, training data 201 may include any relevant pharmacy and prescription data such as an average daily dispensing frequency value, a patient amount, a seasonal dispensing frequency value, a date, a stock capacity, a current cost, a shipping cost, feedback, and a shelf life value over a predetermined period of time Feedback 204 may be any data indicating the relative success of each order and maybe be manually entered via a user input or otherwise determined by analyzing new data. For example, if a given prescription is ordered more frequently than others, then that may indicate that the order amount 232 for the given prescription is too small (or that the threshold amount 233 and/or minimum stocked value 230 are too high). The inventory module 125 may then adjust 205 the stock management model 203 accordingly to reflect the necessary demand and subsequently refine the outputs. In another embodiment, a pharmacist may enter at a computing device of the pharmacy the spoilage numbers for one or more prescription items. Based on the manual feedback 204, the inventory module 125 may adjust 205 the stock management model 203 for each of the prescription items that had excess inventory such that the order amounts 232 for those prescription items are lower.

Figure 3:
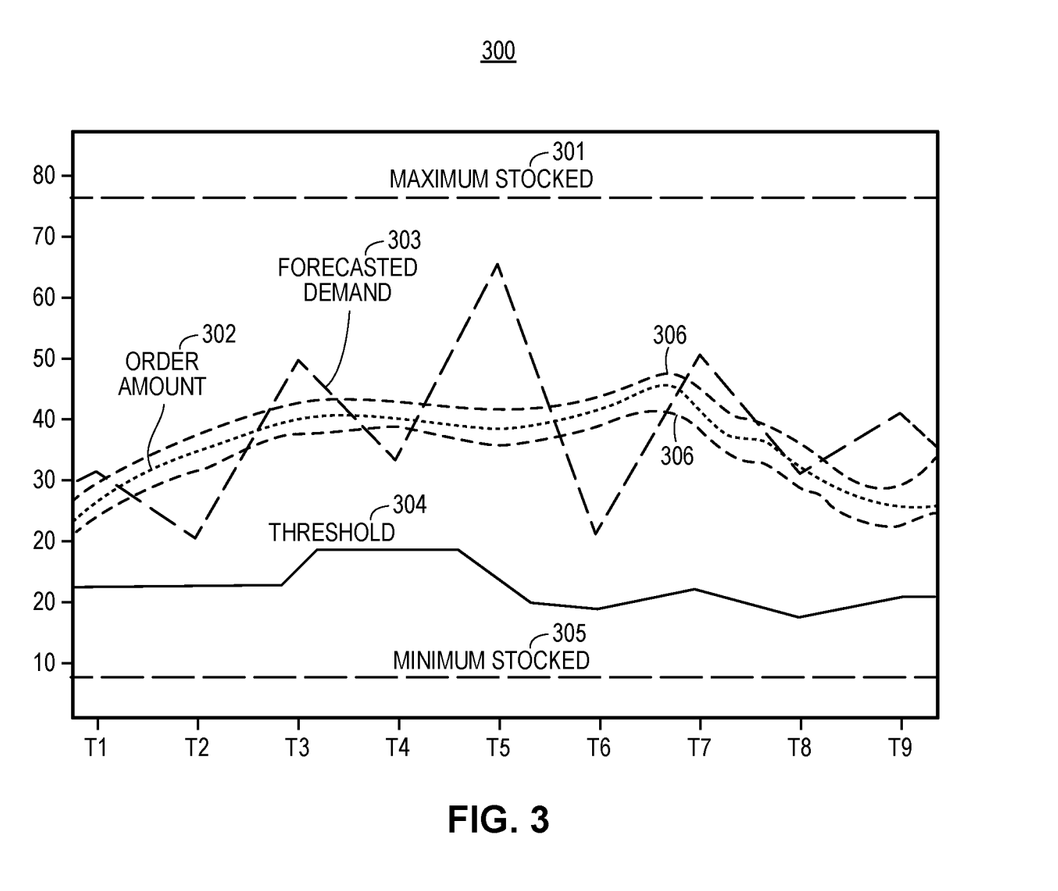
FIG. 3 illustrates an example line graph displaying a forecast of the outputs of the machine learning model of FIG. 2.

FIG. 3 illustrates an example of how the stock management model 203 of FIG. 2 may forecast outputs over time. As discussed above, many factors may influence the stock management model 203 and the outputs 230-233 of FIG. 2. One contributing factor is the date the order is to be placed as prescription needs can vary seasonally, monthly, or even weekly. In order to account for the variable needs, the stock management model 203 may forecast the outputs based on the date.

In an example embodiment, the stock management model 203 may generate weekly forecasts which may include standard forecast error. In turn, the stock management model 203 may provide relatively stable forecasts over time which are not overly influenced to spikes in demand. The forecasts of the stock management model 203 also provide the ability to identify seasonal trends, and thus, the ability to adjust to changes in demand patterns. The stock management model 203 may also provide a measure of forecast error to help plan for when demand exceeds the forecasted order amounts.

In an illustrative example embodiment, the stock management model 203 may analyze 104 weeks of historical data and generate 13 weeks of forecasts and 13 weeks of projected orders. In an embodiment, the stock management model 203 may discount the weight of older data such that older data has less influence on the outputs. In some embodiments, the stock management model 203 may include seasonal demand as a factor for determining forecasts.

To analyze the data, the stock management model 203 may divide the 104 weeks of historical data into 4-week periods, resulting in 26 total periods. The analysis of each 4-week period may then be used to forecast corresponding future periods. For example, the two previous 4-week periods corresponding to July in preceding years may be used to forecast demand for the upcoming month of July. In other embodiments, analysis of each 4-week period may be combined to forecast demand for a generic 4-week period.

To produce forecasts, the incremented historical data may be analyzed and processed such that forecasted outputs are smoother. For example, the stock management model may blend the data in each period. The blending process beginnings with establishing the center points for each 4-week period. The center point is determined by taking the average demand by looking forward and backwards for up to 6 weeks. In an example embodiment, the latest 4-week period of data may be analyzed first to determine a center point, and then each preceding 4-week period may be analyzed subsequently. This first iteration of determining center points may be considered the first "blend" of the double blend calculation to smooth data.

Next, the stock management model may perform operations to further smooth the data, such as double blending, moving averages, weighted regression, etc. The resulting forecast may be a smooth line representing demand versus time. For example, the line graph 300 of FIG. 3 represents the order amount 302 as a smoothed forecast.

In some embodiments, the stock management model may also be configured account for seasonal demand. In this embodiment, in addition to blending the data as described above, the stock management model may additionally divide the 104 weeks of data into eight 13-week periods. The 13-week periods may then be smoothed, as described above, to produce a seasonal-based forecast. In some embodiments, the seasonal-based forecast may be used as the outputs for the stock management model. In other embodiments, the seasonal-based forecast may be combined with other data such that the seasonal-based forecast is one factor of the overall calculations.

Referring back to FIG. 3, the line graph 300 shows an example of the inventory parameters forecasted over a time period. The X-axis of graph 300 includes incremental time period T1-T10, and the Y-axis represents the number units of a prescription item. In the example graph 300, the maximum stocked value 301 and minimum stocked value 305 are constant, while the threshold value 304 and order amount 302 vary in time. Further, in the example graph 300, the order amount 302 is based in part on a smoothed version of the forecasted demand 303. Smoothing the data may cause the order amount 302 to be less reactionary to spikes in demand, thus preventing over/under ordering. In other embodiments, the order amount 302 may also be based on other data, such as historical data, pharmacy data, inventory data, customer data, etc. as discussed above. In the line graph 300, the order amount 302 also includes an error range 306 represented by the dotted lines surrounding the curve.

The example line graph 300 is not intended to be limiting, and is presented as an example embodiment of how the stock management model 203 may forecast outputs for future time periods. As described above, stock management model may continuously recalculate outputs as new data and feedback are received. Accordingly, the outputs 301, 302, 304, 305, and 306 displayed in line graph 300 may also change over time.

As discussed above, the stock management model 203 may forecast demand based on various different data and then determine one or more outputs based on the forecast. FIG. 3 shows an example of forecasted demand 303 for a prescription item. In some embodiments, the forecasted demand 303 may be based on at least 104 weeks' worth of data. In other embodiments, the forecasted demand 303 may be based on as little as 4 weeks' worth of data. Further, the forecasted demand 303 may be forecasted for any amount of time in the future.

The stock management model 203 may then determine each of the other outputs based on the forecasted demand 303. In the example of FIG. 3, the order amount 302 represents a smoothed line corresponding to the forecasted demand 303. In other embodiments, the forecasted demand 303 may be smoothed. In some embodiments, the outputs may be offset from the forecasted demand 303. For example, in some embodiments, the projected order amount 302 may shifted by a factor of one time period such that the order amount 302 is larger preceding a spike in demand, for example.

Figure 4:
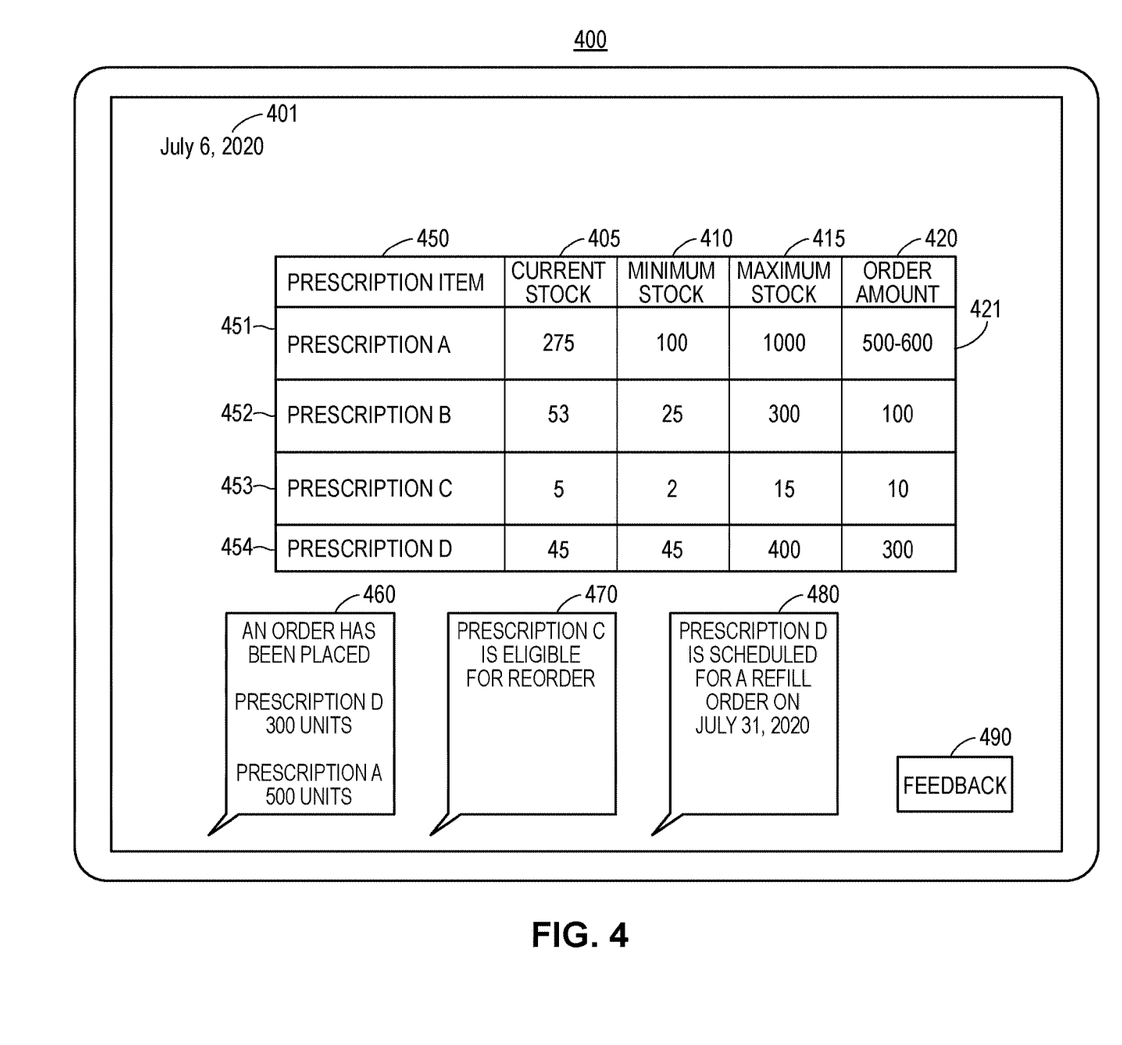
FIG. 4 illustrates an example user-interface screen displaying prescription stock inventory and a notification of a new order and FIG. 5 illustrates a flow diagram of an example method for automated prescription stock management using a machine learning model, which can be implemented in the system of FIG. 1.

Referring now to FIG. 4, an example user-interface 400 displays one or more outputs of the prescription stock management system. The user-interface 400 may be displayed, for example, on a client computing device of the pharmacy used by a pharmacist, such as client computing device 102 of FIG. 1. The user-interface 400 may be used by the system to indicate actions performed by the stock management system, to share forecasted outputs with a pharmacist, and/or to display indications that further actions need to be taken by the pharmacist. The example user-interface 400 is provided for illustrative purposes and is not intended to be limiting embodiment.

The user-interface 400 includes a display of a date 401. As mentioned above, the outputs may be forecasted and vary based on the date. Thus, the information displayed on this particular date 401 may be different the next week, or even the next day. In some embodiments, the displayed parameters may be changed in real-time as additional information is collected by the system and as the stock management system recalculates parameters based on the new data.

The user-interface 400 allows a pharmacist of the system to keep tabs on the stock. Continuing with this example embodiment, the user-interface 400 includes information for a number of prescription items 450, such as the current stock 405, the minimum stocked number 410, the maximum stocked number 415, and the order amount 420. In other embodiments, the user-interface may provide additional data such threshold values for each prescription item 450.

The user-interface 400 includes a notification window 460 indicating that an order has been placed for two prescription items 450. In example interface 400, the order for prescription D 454 is placed as the current stock 405 has reached the minimum stock value 410. As noted in notification window 460, the system has also placed an order for prescription A 451. Although the current stock 405 of prescription A 451 has not reached the minimum stock value 410, the system may have identified that prescription A 451 is eligible for a refill order. For example, the current stock 4051 of prescription A 451 may be below a threshold value (not pictured). Further, both prescription A 451 and prescription D 454 may be items that are shipped by the same manufacturer. Thus, in order to save on shipping costs, the system may determine to place an order for prescription A 451 before the current stock 405 of that prescription item 450 has reached the minimum stock 410 value. However, the order for prescription A 451 may be smaller than if the current stock 405 of prescription A 451 had reached the minimum stocked number 410. For example, the order amount 421 of prescription A 451 may be in a range as opposed to a singular value, in order to account for an error range in the forecasted order amount 420. Thus, the system may place an order at the lower end of the order amount 421 range.

User-interface 400 also includes a notification window 470 indicating that prescription C 453 is eligible for an order. The system may have determined that prescription C 453 is below a threshold value and thus eligible for a refill order, even though the prescription item 450 has not reached the minimum stock 410 value. The notification window 470 informs a pharmacist that current stock 405 for prescription C 453 is running low. In turn, the pharmacist may manually check to see if the current stock 405 number is accurate, manually place an order, or request transfer of stock from another store in the pharmacy chain.

Further, user-interface 400 includes a notification window 480 indicating that a future refill order for prescription B 452 has been scheduled. In an example embodiment, the system may determine that certain prescription items 450 need to be ordered in advance such that new inventory will arrive before the current stock sells out. For example, prescription B 452 may be forecasted to sell out in 28 days, while current shipping times average 21 days. Accordingly, a new order for prescription B 452 may be placed even before the current stock 405 of prescription B 452 reaches the minimum stocked number 410 (or even the threshold value, not pictured).

Further, the user-interface 400 may also include an icon 490 that a pharmacist can use to add feedback. In an embodiment, the pharmacist may click the icon 490 and then enter feedback regarding one or more prescription items 450. For example, a pharmacist may click icon 490 and then provide user inputs indicating that one or more prescription items have had excess stock that resulted in spoilage, and enter the number of units that have gone to waste. In other embodiments, the pharmacist may be able to enter other feedback such as changes to stock capacity, indications of change in demand, indications of changes to store hours, and/or any other factors that might influence the forecast of demand to prescription items 450.

Figure 5:
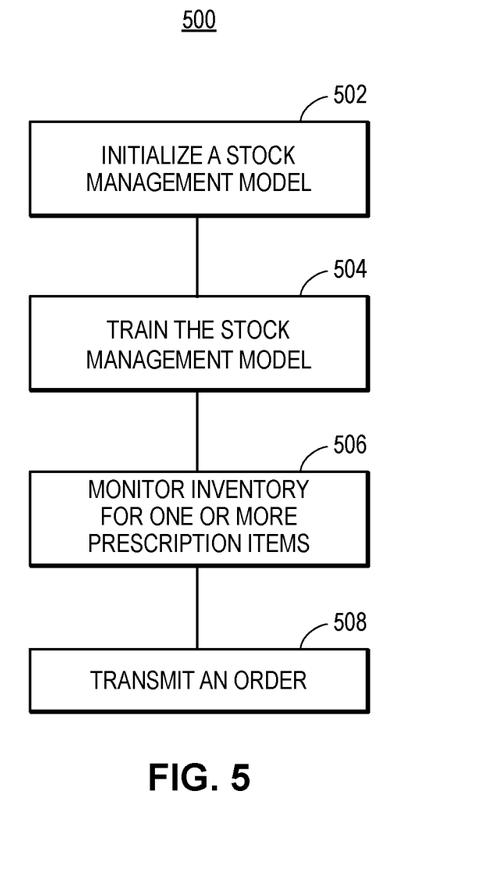

FIG. 5 illustrates an exemplary method 500 in accordance with an exemplary embodiment of the present disclosure. In an embodiment, method 500 may be implemented by any suitable device, such as one or more servers 104 and/or one or more client computing devices 102, for example, as shown in FIG. 1. In an embodiment, method 500 may be performed by any suitable combination of one or more processors, applications, algorithms, and/or routines of a system for prescription stock management, such as the system 100.

Method 500 may start when the system initializes a stock management model (block 502). The stock management model may be used to calculate outputs including a minimum stock number, a maximum stock number, an order amount, and a threshold value for a variety of prescription items. In an embodiment, each prescription item may correspond to a particular iteration of the stock management model. In another embodiment, each pharmacy in a pharmacy chain may have a unique set of stock management models for each prescription item in the pharmacy.

The system may initialize the stock management model using one or more algorithms and an initial data set to produce initial outputs. In an embodiment, the outputs may be singular values. For example, the order amount for a particular prescription item may initially be set for 100 units. In another embodiment, the outputs may be a set of forecasts that are variable over time for a predefined period, such as in the example line graph 300 of FIG. 3.

As described above, the data used for initializing the stock management model may include inventory data, customer data, pharmacy data, and/or historical data, as well as any additional data that may inform the prescription stock needs of one or more pharmacies in a pharmacy chain. In particular, the data may include an average daily dispensing frequency value, a number of customers, a number of prescriptions, a seasonal dispensing frequency value, a prescription cost, a shipping cost, a shelf-life value, etc. The data may be received in any suitable form for a machine learning process, which may include a SAS database, a spreadsheet, files saved in a preferred format, etc.

Initializing the stock management model may also include the selection of one or more algorithms for the stock management model. For example, the system may receive a selection of one or more methodologies, such as weighted regression, time series, linear regression, blending, double blending, iteration, etc. The system may then configure the stock management model with the algorithms to calculate outputs. The received algorithms may consist of a set of weighted equations, and the algorithms may also vary based on how the data is weighted. For example, some algorithms may weigh older data less than newer data, such that the older data does not influence the model, and thus the outputs, as greatly. In other embodiments, the system may receive algorithms that weigh certain data greater than other data, such that the data with the great weight influences the outputs more heavily. As an example, the algorithm may weigh average daily dispense rate greater than the average daily return rate, such that outputs are more directed to managing inventory needs based on consumption without factoring in replenished inventory from returns.

Further, the system may receive an indication of selected data for analysis by the stock management model. For example, in an embodiment the system may receive an indication the average daily return rate should not be factored into the outputs. In another example, the system may receive an indication that that seasonal data should be used by the stock management model. In this example, the system may parse data in seasonal increments (e.g., 4 periods per year) to perform a season analysis, in addition to typical analysis (e.g., 12-24 periods per year) performed by the system. The system may then merge the seasonal analysis with the typical analysis, such that the seasonal analysis influences the outputs.

Next, the system may train the stock management model (block 504). Training the stock management model is an iterative process that includes receiving new data, receiving feedback, evaluating the outputs, and adjusting the stock management model (not necessarily in that order). The new data, for example, can be based newly gathered data corresponding to the data used to initialize the model. The system may improve the stock management model as new data and feedback are received, resulting in more accurate outputs.

In addition to the data, the system may also receive feedback used to determine the accuracy of the outputs. In an embodiment, the feedback may be received through the user-interface of a client computing device of the system. For example, the system may receive an indication of spoilage through a user-interface, where this form of feedback can be used to refine the order amount. In another embodiment, the feedback may be extrapolated from data. In another example, the system may extrapolate from inventory data that a prescription item went out of stock for a period of time. Accordingly, the system may adjust the stock management model such that the minimum stocked number and/or the threshold amount for that prescription item are larger.

In training the stock management model, the system may adjust one or more algorithms. For example, the system may determine that one or more weights need to be increased or decreased in order for the outputs to more accurately reflect the data and feedback. The training process is continuous, and the outputs recalculated as necessary as new data and feedback are received. As larger sets of data and feedback are received, the system may be able to produce better results leading to more efficient stock management with less waste and fewer orders.

The system may then monitor the inventory of one or more prescription items (block 506). In an embodiment, the system may monitor the inventory of the pharmacy locally at a client computing device of the pharmacy. In another embodiment, a server of the system may monitor the inventory by receiving periodic updates from one or more client computing devices of the pharmacy. In other embodiments, the system may receive user-inputs indicating stock of one or more prescription items.

Once the current stock of a prescription item depletes below a minimum stocked number and/or a threshold value, the system may transmit a refill order (block 510). In an embodiment, the system may automatically place the order by communicating with an external device. In another embodiment, the system may display an indication on a user-interface of a client computing device of the system indicating that a refill order should be placed. In still other embodiments, the system may determine that another pharmacy in the pharmacy chain has excess inventory of the prescription item, and arrange for stock to be transferred to the pharmacy with low inventory.

The system may additionally schedule orders for future dates based on forecasted values. For example, a prescription item may have a short shelf life and thus have limited inventory capacity. However, that prescription item may be dispensed at a rate that would result in depleted stock before a new order could be placed and filled. Accordingly, the system may schedule orders to prevent stock outage while also preventing the risk of spoilage from excess inventory.

The method 500 may iterate as new data and feedback are received and adjust the stock management models and recalculate outputs as necessary.

Furthermore, the embodiments described herein provide several advantages. For example, by providing a system for automatically tracking inventory, calculating appropriate order sizes, and placing orders, the stock management process is more efficient than manual methods not implementing the techniques described herein. The systems and methods of the current disclosure not only result in greater efficiency than current systems due to less manual labor, but also result in fewer unnecessary purchase orders being generated, reducing costs. Further, the embodiments described herein improve the technical aspects of existing technology by reducing bandwidth required to submit additional purchase orders and also reduce the overall power consumption of traditional systems.

In addition, the system and methods of the current disclosure implement machine learning to determine outputs. The data analyzed by the system may be tailored based on the needs of one or more pharmacies, such that the outputs are specific to the needs of the one or more pharmacies. For example, each pharmacy in a pharmacy chain may have customized maximum stocked numbers, minimum stocked numbers, order amounts, and threshold amounts for each pharmacy item stocked by the pharmacy. As a result, each pharmacy in a pharmacy chain may gain the advantages described herein. This represents an improvement in data processing and data organization from existing technologies that yields a real and tangible improvement from the systems in use today that do not provide pharmacy data aggregation and integration.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly be configured on a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 500 may include one or more function blocks, modules, individual functions or routines in the form of tangible computer-executable instructions that are stored in a non-transitory computer-readable storage medium and executed using a processor of a computing device (e.g., a server, a personal computer, a tablet computer, a mobile computing device, or other personal computing device, as described herein). The method 500 may be included as part of any backend server (e.g., a data server, a risk server, or any other type of server computing device, as described herein), portable device modules of the example environment, for example, or as part of a module that is external to such an environment. Though the figures may be described with reference to the other figures for ease of explanation, the method 500 can be utilized with other objects and user interfaces. Furthermore, although the explanation above may describe steps of the method 500 being performed by specific devices (such as a client computing device 102, and a server 104), this is done for illustration purposes only.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing automated stock management via machine learning through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims It should be understood that, unless a term is expressly defined in this patent application using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

What is claimed is:

1. A computer-implemented method of performing improved prescription stock management, comprising:
   initializing, using a plurality of machine learning algorithms, a stock management model for at least one prescription item of a plurality of prescription items,
   wherein the stock management model produces forecasted outputs including a minimum stocked number, a maximum stocked number, an order amount for the at least one prescription item, and a threshold value for an inventory of the at least one prescription item,
   wherein initializing the stock management model further includes calculating initial forecasted outputs each corresponding to a respective number of units of a respective prescription item,
   wherein the initial forecasted outputs are based on forecasts for a predefined amount of time, and
   wherein at least the order amount is variable based on the predefined amount of time;
   determining, using the plurality of machine learning algorithms, one or more stock thresholds based on the forecasted outputs, wherein the one or more stock thresholds prevent understocking or overstocking prescription items;
   monitoring, by one or more processors, an inventory for one or more prescription items from the plurality of prescription items at a pharmacy, wherein the monitoring includes:
   (a) training, by one or more processors using a machine learning algorithm, the stock management model using training data,
   wherein the machine learning algorithm includes one or more of: weighted regression, or blending, and
   wherein the training includes improving accuracy of at least one output of the initial forecasted outputs by:

(1) receiving feedback data that indicates the accuracy of the initial forecasted outputs after a period of time including success of each order amount over the period of time; and
(2) adjusting, as additional training data and feedback is received, weights of the stock management model, wherein the adjusting includes generating refined forecasted outputs corresponding to the initial forecasted outputs;
(b) determining that an inventory for at least one prescription item of the one or more prescription items satisfies a corresponding stock threshold; and
(c) transmitting, by one or more processors, an order to an external computing device when the inventory for the at least one prescription item is less than a corresponding minimum stocked number, wherein the order is based on the order amount; and
receiving, by one or more processors, one or more stock management algorithms;
receiving, by one or more processors, initialization data; and
calculating, by one or more processors and based on the one or more stock management algorithms and initialization data, initial values for the minimum stocked number, the maximum stocked number, the order amount for the at least one prescription item, and the threshold value.

2. The computer-implemented method of claim 1, wherein training the stock management model further comprises:
receiving, by one or more processors, the training data corresponding to the at least one prescription item of the plurality of prescription items; and
recalculating, by one or more processors and based on the training data, the minimum stocked number, the maximum stocked number, the order amount for the at least one prescription item, and the threshold value.

3. The computer-implemented method of claim 1, wherein the training data includes one or more of inventory data, customer data, pharmacy data, or historic data.

4. The computer-implemented method of claim 1, wherein the initial forecasted outputs and the forecasted outputs of the stock management model are based on seasonal demand.

5. The computer-implemented method of claim 1, wherein initialization data comprises data corresponding to a period of time, the period of time including one of at least a 104 week period, at least a 52 week period, or at least a 4 week period.

6. The computer-implemented method of claim 1, further comprising: causing, at a user-interface of a computer of the pharmacy, a display of an indication of a transmission of the order.

7. A system for performing improved prescription stock management, the system comprising:
a database configured to store an inventory for one or more prescription items from a plurality of prescription items at a pharmacy,
an input device communicatively coupled to the database,
one or more non-transitory storage media configured to store processor-executable instructions, and
one or more processors operatively connected to the database, the input device, and the one or more non-transitory storage media and configured to execute the processor-executable instructions to cause the system to:

initialize, using a plurality of machine learning algorithms, a stock management model for at least one prescription item of a plurality of prescription items,
wherein the stock management model produces forecasted outputs including a minimum stocked number, a maximum stocked number, an order amount for the at least one prescription item, and a threshold value for an inventory of the at least one prescription item,
wherein to initialize the stock management model further includes to calculate initial forecasted outputs each corresponding to a respective number of units of a respective prescription item,
wherein the initial forecasted outputs are based on forecasts for a predefined amount of time, and
wherein at least the order amount is variable based on the predefined amount of time;
determine, using the plurality of machine learning algorithms, one or more stock thresholds based on the forecasted outputs, wherein the one or more stock thresholds prevent understocking or overstocking prescription items;
monitor an inventory for one or more prescription items from the plurality of prescription items at a pharmacy, wherein the monitoring includes:
(a) training, using a machine learning algorithm, the stock management model using training data,
wherein the machine learning algorithm includes one or more of: weighted regression, or blending, and
wherein the training includes improving accuracy of at least one output of the initial forecasted outputs by:
(1) receiving feedback data that indicates the accuracy of the initial forecasted outputs after a period of time including success of each order amount over the period of time; and
(2) adjusting, as additional training data and feedback is received, weights of the stock management model, wherein the adjusting includes generating refined forecasted outputs corresponding to the initial forecasted outputs;
(b) determining that an inventory for at least one prescription item of the one or more prescription items satisfies a corresponding stock threshold; and
(c) transmitting an order to an external computing device when the inventory for the at least one prescription item from the plurality of prescription items is less than a corresponding minimum stocked number, wherein the order is based on the order amount;
receive one or more stock management algorithms;
receive initialization data; and
calculate, based on the one or more stock management algorithms and initialization data, initial values for the minimum stocked number, the maximum stocked number, the order amount for the at least one prescription item, and the threshold value.

8. The system of claim 7, wherein initialization data comprises data corresponding to a period of time, the period of time including one of at least a 104 week period, at least a 52 week period, or at least a 4 week period.

9. The system of claim 7, wherein the instructions to train the stock management model further cause the system to:
receive the training data corresponding to the at least one prescription item of the plurality of prescription items; and
recalculate, based on the training data the minimum stocked number, the maximum stocked number, the order amount for the at least one prescription item, and the threshold value.

10. The system of claim 7, wherein the at least one prescription item is one or more of a prescription medication, a non-prescription medication, or a medical device.

11. The system of claim 7, wherein the initial forecasted outputs and the forecasted outputs of the stock management model are based on seasonal demand.

12. The system of claim 7, wherein the input device further comprises a user-interface, and wherein the instructions further cause the system to:
display at the user-interface of the input device an indication of a transmission of the order.

13. The system of claim 7, wherein the system further includes:
one or more databases storing initialization data and training data, and wherein the one or more databases include inventory data, customer data, pharmacy data, and historic data.

14. A tangible, non-transitory computer-readable medium storing processor-executable instructions that, when executed by one or more processors of a system, cause the system to:
initialize, using a plurality of machine learning algorithms, a stock management model for at least one prescription item of a plurality of prescription items,
wherein the stock management model produces forecasted outputs including a minimum stocked number, a maximum stocked number, an order amount for the at least one prescription item, a threshold value for an inventory of the at least one prescription item,
wherein to initialize the stock management model further includes to calculate initial forecasted outputs each corresponding to a respective number of units of a respective prescription item,
wherein the initial forecasted outputs are based on forecasts for a predefined amount of time, and
wherein at least the order amount is variable based on the predefined amount of time;
determine, using the plurality of machine learning algorithms, one or more stock thresholds based on the forecasted outputs, wherein the one or more stock thresholds prevent understocking or overstocking prescription items;
monitor, by one or more processors, an inventory for one or more prescription items from the plurality of prescription items at a pharmacy, wherein the monitoring includes:
(a) train, using a machine learning algorithm, the stock management model using training data,
wherein the machine learning algorithm includes one or more of: weighted regression, or blending, and
wherein the training includes improving accuracy of at least one output of the initial forecasted outputs by:
(1) receiving feedback data that indicates the accuracy of the initial forecasted outputs after a period of time including success of each order amount over the period of time; and
(2) adjusting, as additional training data and feedback is received, weights of the stock management model,
wherein the adjusting includes generating refined forecasted outputs corresponding to the initial forecasted outputs; and
(b) determining that an inventory for at least one prescription item of the one or more prescription items satisfies a corresponding stock threshold; and
(c) transmit an order to an external computing device when the inventory for the at least one prescription item is less than a corresponding minimum stocked number, wherein the order is based on the order amount;
receive one or more stock management algorithms;
receive initialization data; and
calculate, based on the one or more stock management algorithms and initialization data, initial values for the minimum stocked number, the maximum stocked number, the order amount for the at least one prescription item, and the threshold value.

15. The tangible, non-transitory computer-readable medium of claim 14, wherein the processor-executable instructions, when executed, further cause the system to:
receive the training data corresponding to the at least one prescription item of the plurality of prescription items; and
recalculate, based on the training data the minimum stocked number, the maximum stocked number, the order amount for the at least one prescription item, and the threshold value.

16. The tangible, non-transitory computer-readable medium of claim 14, wherein the processor-executable instructions, when executed, further cause the system to:
display, at a user-interface of an input device, an indication of a transmission of the order.

* * * * *